Nov. 27, 1956  R. E. LINDSEY  2,771,668
METHOD OF PREPARATION OF BAKING PANS FOR BREAD
Filed Aug. 19, 1953
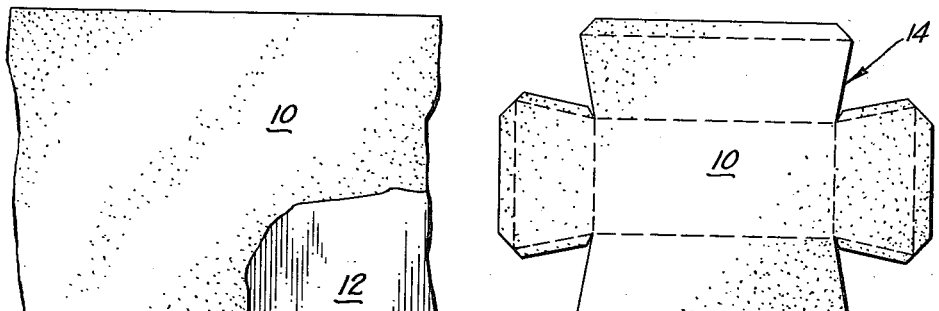
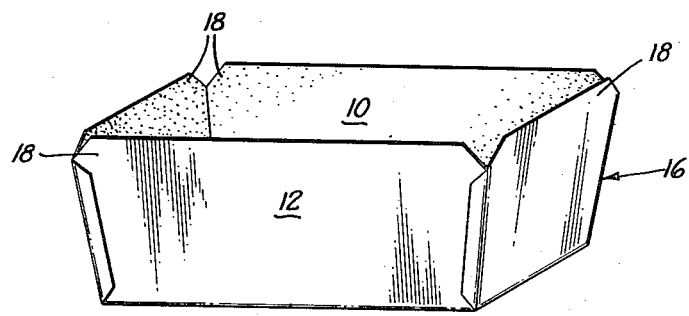
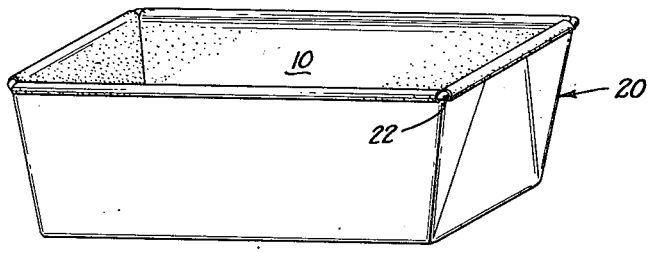
INVENTOR.
Richard E. Lindsey
BY
ATTORNEYS United States Patent Office 2,771,668
Patented Nov. 27, 1956

2,771,668

METHOD OF PREPARATION OF BAKING PANS FOR BREAD

Richard E. Lindsey, Redwood City, Calif.

Application August 19, 1953, Serial No. 375,195

1 Claim. (Cl. 29—423)

This invention relates to the baking of bread, and more particularly to a method of preparing bread baking pans so as to obtain quick and efficient release of the baked bread therefrom.

One of the most difficult problems to be solved in connection with the baking of bread is the preparation of the bake pans in such manner as to economically overcome the necessity for greasing or otherwise treating a pan after each baking operation so as to insure quick and efficient release of the baked bread from the pan. This particular problem and one approach to the solution of the same is well set forth in the patent to Collings 2,606,510.

Much effort has been put into attempts to devise methods for the economical and efficient application of such coating materials as resin polymers directly to the baking pans, but present day bakery practice mitigates against a satisfactory solution of the problem along this line. For example, it is common practice in the bakery art to interconnect a plurality of bake pans together to form what is called a rack or strap. Thus, when the coating which has been directly applied to one pan wears out to the point where the pan can no longer be properly used, it becomes necessary to transport the whole rack to a place where the coating can be renewed, and the application of the coating at such place, whether by spray gun, dipping or brushing operation is a tedious, time consuming and therefore expensive one due to the shapes of the pans themselves and to their interconnected, or rack, relationship. Furthermore, when it becomes necessary to reapply a resin polymer coating directly to a pan, as for example, a polytetrafluoroethylene coating composition, it is as a practical matter, necessary to subject the pan to a temperature of 900–1000° F. to burn off the remainder of the old coating so that a uniform and new coating may be applied. Such a temperature is very injurious to the bake pans.

These and other disadvantages which are inherent in the direct application of relatively tough coating films to the baking pans are eliminated by the coating method of the present inventions.

Broadly, the present invention comprises the coating in the flat of thin gauge material having good heat conductor properties with a liquid coating composition, such as a polytetrafluoroethylene finish, with the carrier material for the protective finish being sufficiently light in body to be readily deformable into a shape corresponding to a bread pan, and with the carrier material having at the same time sufficient body to be retained in flange connected relation with the pan once it has been placed in the pan and once the flange connection has been achieved, either by hand or with some simple hand operated rolling tool.

Various objects and advantages of the invention will be apparent from the following description taken in conjunction with the drawing forming part of this specification, and in which:

Figure 1 is a plan view of a portion of a web of carrier material, or pan liner material, covered at one side thereof with polytetrafluoroethylene finish, a portion of the finish being broken away to disclose the liner material;

Figure 2 is a plan view of a liner blank in flat condition as it appears following a stamping out operation performed on the web of Figure 1;

Figure 3 is a view in perspective of a preformed coated liner formed from the blank of Figure 2; and Figure 4 is a view in perspective of a baking pan having in flange-connected relation therewith the preformed liner of Figure 3.

In practicing the process of the invention, I impart a tough resilient film, such as a polytetrafluoroethylene finish 10, to a thin gauge metal web 12, preferably by a spraying operation. After the finish on the web has been properly dried and baked, the web is cut to form a plurality of blanks 14, as shown in Figure 2. Thereafter, the blanks 14 are formed into the liners 16 having upwardly extending panel portions 18, as shown in Figure 3, and in this condition the liners are shipped to the bakeries for placement in and connection with bake pans, such as that indicated at 20 in Figure 4. The pans 20 are conventionally provided with rolled bead edges 22 over which the upstanding portions 18 of the blanks 16 are turned, said blanks being sufficiently workable to enable this turning to be simply achieved by hand or by a simple hand-operated roller-type tool.

The metal I prefer to employ for the web 10 is thin gauge annealed aluminum, such as 2S–O alloy which is termed to be commercialy pure but which actually contains small amounts of iron and silicone. I prefer fully annealed aluminum because of its relative softness and workability. This particular alloy is also desirable from the standpoint of cost. A preferred gauge for the web 10 is 0.012 inch. Web thicknesses as great as 0.040 inch are usable, but the cost thereof is much greater than the lower gauge material, and the stiffness offered by the thicker material is not normally needed to insure that the pan liner will be retained in flange connected relation to the pan, as shown in Figure 4.

As to the coating material 12, I prefer to employ polytetrafluoroethylene finishes of the type identified and described in E. I. du Pont de Nemours & Co. (Inc.) publication entitled "New Product Technical Bulletin," Bulletin No. 1 (second revision), bearing publication date of March, 1953. The "Teflon" Primer for Aluminum (850–202) may be used either alone or as a first coating, following which any one of the Teflon enamels set forth and described in said bulletin may be applied.

For the coating material, it is sufficient if the web is merely cleaned with fine grain sandpaper. Following spray application of the coating material, the web is subjected to a force drying operation at approximately 200° F. to drive the water out of the coating. The coating is then baked onto the web at a temperature within the range of approximately 700–800° F. As stated, the coating material 12 can be applied in one or more coats and may vary in total film thickness from 0.0003 to 0.009 inch, with the practical thickness range being, however, from 0.0005 inch to 0.003 inch. A film thickness below the lower value of this range will not last long enough in bakery use, while a film thickness in excess of the upper limit of this range costs too much in proportion to what added bakery use may be obtained from it.

The provision of a coated liner enables the individual baker to insert the liner within a bake pan and secure it thereto by hand. The baker may purchase the liners in bulk lots and keep them on hand in order to service the various bake pans as the need therefor arises, and under these conditions the pan racks do not need to be removed from the bakery, and the pans are therefor not placed out of use for any appreciable period of time. Also, the previously encountered problem of transporting large numbers of baking pans from a bakery to a point for direct coating treatment is eliminated.

Further advantages to be derived from the use of a bake pan prepared according to the subject method are as follows: a more satisfactory coating finish is obtainable when the finish is applied to a flat web, rather than directly to the inner sides of a bake pan; the employment of a coated liner eliminates the interior wear on the pans arising from bakery use. The coated liner allows the pans to be used even though they may be worn to the point of having small holes therein, and thus the effective life span of the pan is materially increased. When a coated liner is employed, it is of course not necessary to hand clean the individual pans to obtain a thoroughly clean surface, the same being an essential conditioning operation in connection with the application of coating materials directly to the pans; and since the polytetrafluoroethylene coating must be baked at temperatures approximately within the range of 700–800° F., the subjection of the bake pans themselves to these temperatures, which cause the tin coating on some pans to be melted and thus permit the pan to rust, is eliminated.

These advantages and those previously mentioned are factors to be considered in addition to the economics of the situation as far as the individual baker is concerned. Thus, in practice the cost to a baker of a new direct coating on an individual bake pan is approximately $3.50, while the price of a coated liner to the baker is approximately $1.00.

While a preferred mode of practicing the method of the invention has been shown and described, it is to be understood that all substantial equivalents thereof are considered to be within the spirit and scope of the invention.

What is claimed is:

A method for providing a bread baking pan with a continuous but removable and replaceable internal coating which is repetitively non-adherent with respect to bread baked therein comprising applying to a flat web of metal having good heat conductor properties and sufficient thinness to be hand worked a polytetrafluoroethylene film 0.0003–0.009 inch thick, baking said film onto said web, deforming a portion of said web into a bread baking pan liner of slightly greater depth than a baking pan, inserting said liner into a baking pan, and removably securing said liner to said pan by manually turning down the top edge portions of said liner into clamping relation with the top edge portions of said pan.

References Cited in the file of this patent

UNITED STATES PATENTS

| | | |
|---|---|---|
| 1,707,655 | Cohn | Apr. 2, 1929 |
| 1,917,217 | Curry | July 11, 1933 |
| 2,042,070 | McCaskell | May 26, 1936 |
| 2,226,155 | Bjorson | Dec. 24, 1940 |
| 2,236,992 | Broadley | Apr. 1, 1941 |